United States Patent
Khan et al.

(10) Patent No.: US 7,302,522 B2
(45) Date of Patent: Nov. 27, 2007

(54) OPTIMIZING I/O PERFORMANCE IN A RAID SUBSYSTEM USING AN ADAPTIVE MAXIMUM REQUEST SIZE FOR A LOGICAL DRIVE

(75) Inventors: Ismail Khan, Fremont, CA (US); Seokmann Ju, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 373 days.

(21) Appl. No.: 11/024,345

(22) Filed: Dec. 27, 2004

(65) Prior Publication Data
US 2006/0143379 A1 Jun. 29, 2006

(51) Int. Cl.
*G06F 12/00* (2006.01)
*G06F 13/00* (2006.01)
*G06F 13/28* (2006.01)

(52) U.S. Cl. .................................... 711/114; 713/1
(58) Field of Classification Search ............... None
See application file for complete search history.

(56) References Cited

U.S. PATENT DOCUMENTS

| 5,524,204 | A * | 6/1996 | Verdoorn, Jr. | 714/6 |
| 6,678,812 | B1 * | 1/2004 | Begis et al. | 711/171 |
| 2003/0061362 | A1 * | 3/2003 | Qiu et al. | 709/229 |
| 2003/0115414 | A1 * | 6/2003 | Tomita | 711/114 |
| 2003/0196023 | A1 * | 10/2003 | Dickson | 711/1 |
| 2004/0024963 | A1 * | 2/2004 | Talagala et al. | 711/114 |
| 2004/0225926 | A1 * | 11/2004 | Scales et al. | 714/43 |
| 2005/0097290 | A1 * | 5/2005 | Cochran et al. | 711/165 |

* cited by examiner

*Primary Examiner*—Hong Kim
*Assistant Examiner*—Marwan Ayash
(74) *Attorney, Agent, or Firm*—Cochran, Freund & Young LLC

(57) ABSTRACT

Disclosed is an adaptive maximum request size process to change the maximum request size for a RAID system in order to reflect the highest possible maximum request size permitted by the RAID type and the physical drives included in the RAID system. The maximum request size is a primary limiting characteristic for physical drive and logical drive performance. The logical drive maximum request size is limited by the physical drive maximum request size. Physical drives supporting older revisions of the physical drive standards have a much lower maximum request size than physical drives supporting newer revisions of the physical drive standard. The adaptive maximum request size process permits a RAID system to adjust the maximum request size to reflect the highest possible maximum request size allowed for a given system based on the physical drives of the RAID system and the RAID types of all RAID logical drives. The adaptive maximum request size process also permits a RAID system to mix physical drives from older and newer generations while still achieving the highest possible maximum request size for the RAID system.

10 Claims, 4 Drawing Sheets

OPTIMIZING I/O PERFORMANCE IN A RAID SUBSYSTEM USING AN ADAPTIVE MAXIMUM REQUEST SIZE FOR A LOGICAL DRIVE

BACKGROUND OF THE INVENTION a. Field of the Invention

The present invention generally pertains to storage systems and more particularly to Redundant Array of Independent Disks (RAID) data storage systems.

b. Description of the Background

A Redundant Array of Independent Disks (RAID) data storage system is a method of using multiple physical hard drives to act as a single logical hard drive for interaction with a host computer. Each Physical Drive (PD) has a partition dedicated to the RAID Logical Drive (LD). The use of partitions on multiple physical drives is referred to as striping. The logical drive acts as a logical abstraction and allows the physical drives to interact with the host computer as a single data storage drive. Since it is possible to partition each physical drive into multiple partitions, it is possible to create multiple RAID logical drives using the same physical drives. While most of the advantages of a RAID system are lost, it is possible to create some types of RAID systems using a single physical drive. RAID controller software provides the abstraction interface to allow the RAID system to appear as an abstracted logical drive to the computer Operating System (OS). The RAID controller software may be implemented as a software driver running under the computer operating system, sometimes called a software RAID controller, or as a firmware controller running on a separate piece of hardware, sometimes called a hardware RAID controller. The software RAID controller is written in the form of a device driver for the computer operating system.

A RAID storage system has two primary advantages versus a single physical drive storage system, i.e., data redundancy and higher speed data communication Input/Output (I/O). A RAID system allows for data redundancy by duplicating data stored on a single physical drive onto at least two physical drives within the RAID storage system. The data redundancy feature insures against data loss and subsequent system failure if one of the physical drives fails. Higher speed data I/O is achieved by parallel communication with multiple physical drives for sending and receiving data that would typically be written to a single physical drive and would typically be limited to the physical I/O speed of the single physical drive. Data redundancy and higher speed I/O act in opposition to each other within a RAID storage system. That is, the more the system is optimized for data redundancy the slower the I/O speed, and the higher the I/O speed the lower the data redundancy. Hence, there are a variety of RAID types that vary the data redundancy and I/O tradeoffs in an assortment of schemes in order to optimize the RAID performance to achieve end user goals.

A RAID system that optimizes purely for speed, with no data redundancy, is referred to as a RAID-0 system. A RAID system that optimizes purely for redundancy, with no effort to achieve higher I/O speed, is referred to as a RAID-1 system. Other RAID types fall somewhere in the middle between a RAID-0 and a RAID-1 system, with a variety of efforts to maximize both the data redundancy and the higher speed I/O features of a RAID system. The selection of a RAID type is often dependant on the type of data that is intended to be stored on the RAID storage system. The type of data stored may vary by file size, whether the file is read or written more often, as well as other data file attributes.

Each non-redundant physical drive within the RAID system is counted as a stripe. Therefore, the number of stripes is equal to the number of non-redundant physical drives within a RAID system. The size of the partition on each physical drive is referred to as the stripe size. For a RAID-0 system, with no redundancy, the number of stripes is equal to the number physical drives in the RAID system. For a RAID-1 system, often referred to as a mirroring system, there are two redundant physical drives storing the same, or mirroring, the data. In the RAID-1 system, there is only one non-redundant physical drive, and hence, there is only one stripe for the system. Consequently, a RAID-1 system is often referred to as a non-striping RAID system. When multiple RAID logical drives use the same physical drives, each RAID logical drive may be a different RAID type. Hence, each RAID logical drive using the same physical drives may have a different stripe size and a different number of stripes.

A RAID system may use virtually any type of physical drive as the physical drives within the RAID system. There are two primary families of physical drive types. There are drives that follow the Integrated Drive Electronics/Advanced Technology Attachment (IDE/ATA) family of standards, and there are physical drives that follow the Small Computer System Interface (SCSI) family of standards. Each standard family has multiple generations, or revisions, of the standard specifying various aspects of the physical drive communication interface. New revisions of the standards reflect technology advancements and generally allow greater I/O capabilities for physical drives supporting the updated standard revision. Information on the IDE/ATA and SCSI standards is kept by the American National Standards Institute (ANSI). ANSI is located at 11 West 42nd Street, 13th Floor, New York, N.Y. 10036, telephone number 212-642-4900, and web site www.ansi.org.

Generally, RAID systems are created using physical drives that support the same standard family and revision. By using physical drives supporting the same standard family and revision, the RAID system operates all physical drives with the same I/O characteristics. One such I/O characteristic is the maximum request size of the RAID logical drive. The maximum request size controls the maximum amount of data that the computer Operating System (OS) may transfer to or from the logical drive in a single data transfer transaction. In order to support all varieties of physical drives, the RAID controller software typically sets the overall RAID logical drive characteristics, including the maximum request size, to match the characteristics of the oldest physical drive standard family revision that may be included in the RAID system.

SUMMARY OF THE INVENTION

The present invention overcomes the disadvantages and limitations of the prior art by providing an adaptive request size process to change the request size for a RAID system to fit within the request size permitted by the RAID type and the physical drives included in the RAID system.

An embodiment of the present invention may therefore comprise a method for optimizing the communication speed of a RAID storage system comprising the steps of: connecting a combination of RAID physical drives containing at least one RAID physical drive to a personal computer in order to operate the combination of RAID physical drives as part of the RAID storage system, the RAID storage system creating a RAID logical drive to interface with the personal computer; inspecting each RAID physical drive to determine a physical drive maximum request size value for each RAID physical drive; determining a combined physical drive maximum request size value by setting the combined physical drive maximum request size value equal to the smallest physical drive maximum request size value of any RAID physical drive in the combination of RAID physical drives; determining a number of stripes value for the RAID logical drive based on the combination of physical drives and a RAID type value for the RAID logical drive; determining a logical drive maximum request size value for the RAID logical drive, the logical drive maximum request size value determined by comparing a stripe size value for the RAID logical drive to the combined physical drive maximum request size value, if the stripe size value is greater than the combined physical drive maximum request size value then the logical drive maximum request size value is set equal to the combined physical drive maximum request size value, if the stripe size value is not greater than the combined physical drive maximum request size value then the logical drive maximum request size value is set equal to the physical drive maximum request size value multiplied times the number of stripes value; and reporting the logical drive maximum request size value of the RAID logical drive to the personal computer.

An embodiment of the present invention may further comprise a method for optimizing the communication speed of a RAID storage system comprising the steps of: connecting a combination of RAID physical drives containing at least one RAID physical drive to a personal computer in order to operate the combination of RAID physical drives as part of the RAID storage system, the RAID storage system creating a RAID logical drive to interface with the personal computer, each RAID physical drive may be any standard type of physical drive, the standard type of physical drive being a physical drive supporting any revision of any standard physical drive protocol, the RAID logical drive being a logical abstraction of a combination of RAID physical drive partitions, each RAID physical drive containing one of the RAID physical drive partitions for the RAID logical drive, the RAID logical drive interfacing as a single logical data storage drive with a computer operating system, the computer operating system running on the personal computer; inspecting each RAID physical drive to determine a supported physical drive protocol and revision for each RAID physical drive, the supported physical drive protocol and revision defining a permitted maximum request size value for a single data transfer request of any physical drive that operates according to the supported physical drive protocol and revision; determining a physical drive maximum request size value for each RAID physical drive by setting the physical drive maximum request size value of each RAID physical drive equal to the permitted maximum request size value associated with the supported physical drive protocol and revision of each RAID physical drive; determining a combined physical drive maximum request size value by setting the combined physical drive maximum request size value equal to the smallest physical drive maximum request size value of any RAID physical drive in the combination of RAID physical drives; determining a logical drive maximum request size value for the RAID logical drive by performing a RAID logical drive maximum request size procedure, the RAID logical drive maximum request size procedure comprising the steps of: setting a stripe size value for the RAID logical drive to a stripe size user configuration input value for the RAID logical drive; setting a RAID type for the RAID logical drive to a RAID type user configuration input for the RAID logical drive; setting a number of stripes value for the RAID logical drive equal to a total count of non-redundant RAID physical drives of the combination of RAID physical drives, the non-redundant RAID physical drives determined according to the RAID type of the RAID logical drive; and computing the logical drive maximum request size value for the RAID logical drive by comparing the stripe size value of the RAID logical drive to the combined physical drive maximum request size value, if the stripe size value of the RAID logical drive is greater than the combined physical drive maximum request size value then the logical drive maximum request size value of the RAID logical drive is set equal to the combined physical drive maximum request size value, if the stripe size value of the RAID logical drive is not greater than the combined physical drive maximum request size value then the logical drive maximum request size value of the RAID logical drive is set equal to the physical drive maximum request size value multiplied times the number of stripes value of the RAID logical drive; and reporting the logical drive maximum request size value of the RAID logical drive to the computer operating system of the personal computer, permitting the computer operating system to optimize data transfer with the RAID logical drive by permitting a data transfer size up to the logical drive maximum request size for the RAID logical drive.

An embodiment of the present invention may further comprise a RAID adaptive maximum request size software program for determining maximum request size values for a RAID storage system comprising: a RAID physical drive configuration process for defining RAID physical drive configuration settings of the RAID storage system, the RAID storage system comprising a combination of RAID physical drives containing at least one RAID physical drive connected to a personal computer in order to operate the combination of RAID physical drives as part of the RAID storage system, the RAID storage system having a RAID logical drive to interface with the personal computer, the RAID physical drive configuration process further comprising: a physical drive maximum request size value for each said RAID physical drive, the physical drive maximum request size value set in accordance with physical attributes of each said RAID physical drive; a combined physical drive maximum request size value, the combined physical drive maximum request size value being equal to the smallest physical drive maximum request size value of any RAID physical drive in the combination of RAID physical drives; a RAID logical drive configuration process for defining RAID logical drive configuration settings of the RAID storage system, the RAID logical drive configuration process further comprising: a number of stripes value for the RAID logical drive, the number of stripes value being based on the combination of physical drives and a RAID type value for the RAID logical drive; a logical drive maximum request size value for the RAID logical drive determined by comparing a stripe size value for the RAID logical drive to the combined physical drive maximum request size value, if the stripe size value is greater than the combined physical drive maximum request size value then the logical drive maximum request size value is set equal to the combined physical drive maximum request size value, if the stripe size value is not greater than the combined physical drive maximum request size value then the logical drive maximum request size value is set equal to the physical drive maximum request size value multiplied times the number of stripes value; and a RAID operation process, the RAID operation process reporting the logical drive maximum request size value of the RAID logical drive to the personal computer.

An embodiment of the present invention may further comprise a RAID adaptive maximum request size software program for determining maximum request size values for a RAID storage system comprising: a RAID physical drive configuration process for defining RAID physical drive configuration settings of the RAID storage system, the RAID storage system comprising a combination of RAID physical drives containing at least one RAID physical drive connected to a personal computer in order to operate the combination of RAID physical drives as part of the RAID storage system, the RAID storage system having a RAID logical drive to interface with the personal computer, each RAID physical drive may be any standard type of physical drive, the standard type of physical drive being a physical drive supporting any revision of any standard physical drive protocol, the RAID logical drive being a logical abstraction of a combination of RAID physical drive partitions, each RAID physical drive containing one of the RAID physical drive partitions for the RAID logical drive, the RAID logical drive interfacing as a single logical data storage drive with a computer operating system, the computer operating system running on the personal computer, the RAID physical drive configuration process further comprising: a supported physical drive protocol and revision value for each RAID physical drive, the supported physical drive protocol and revision value obtained by reading physical drive definition data from each RAID physical drive, the supported physical drive protocol and revision value indicating a supported physical drive protocol and revision, the supported physical drive protocol and revision defining a permitted maximum request size value for a single data transfer request of any physical drive that operates according to the supported physical drive protocol and revision; a physical drive maximum request size value for each RAID physical drive, the physical drive maximum request size value for each RAID physical drive being equal to the permitted maximum request size value associated with the supported physical drive protocol and revision of each RAID physical drive; a combined physical drive maximum request size value, the combined physical drive maximum request size value being equal to the smallest physical drive maximum request size value of any RAID physical drive in the combination of RAID physical drives; a RAID logical drive configuration process for defining RAID logical drive configuration settings of the RAID storage system, the RAID logical drive configuration process further comprising: a stripe size user configuration input for the RAID logical drive for obtaining a stripe size value for the RAID logical drive; a RAID type user configuration input for the RAID logical drive for obtaining a RAID type for the RAID logical drive; and a number of stripes value for the RAID logical drive, the number of stripes value for the RAID logical drive being set equal to a total count of non-redundant RAID physical drives of the combination of RAID physical drives, the non-redundant RAID physical drives determined according to the RAID type of the RAID logical drive; a logical drive maximum request size value for the RAID logical drive determined by comparing the stripe size value of the RAID logical drive to the combined physical drive maximum request size value, if the stripe size value of the RAID logical drive is greater than the combined physical drive maximum request size value then the logical drive maximum request size value of the RAID logical drive is set equal to the combined physical drive maximum request size value, if the stripe size value of the RAID logical drive is not greater than the combined physical drive maximum request size value then the logical drive maximum request size value of the RAID logical drive is set equal to the physical drive maximum request size value multiplied times the number of stripes value of the RAID logical drive; a RAID operation process that creates and operates the RAID storage system according to the RAID physical drive configuration settings and the logical drive configuration settings, the RAID operation process reporting the logical drive maximum request size value of the RAID logical drive to the computer operating system of the personal computer, permitting the computer operating system to optimize data transfer with the RAID logical drive by permitting a data transfer size up to the logical drive maximum request size for the RAID logical drive.

DETAILED DESCRIPTION OF THE INVENTION

Figure 1:
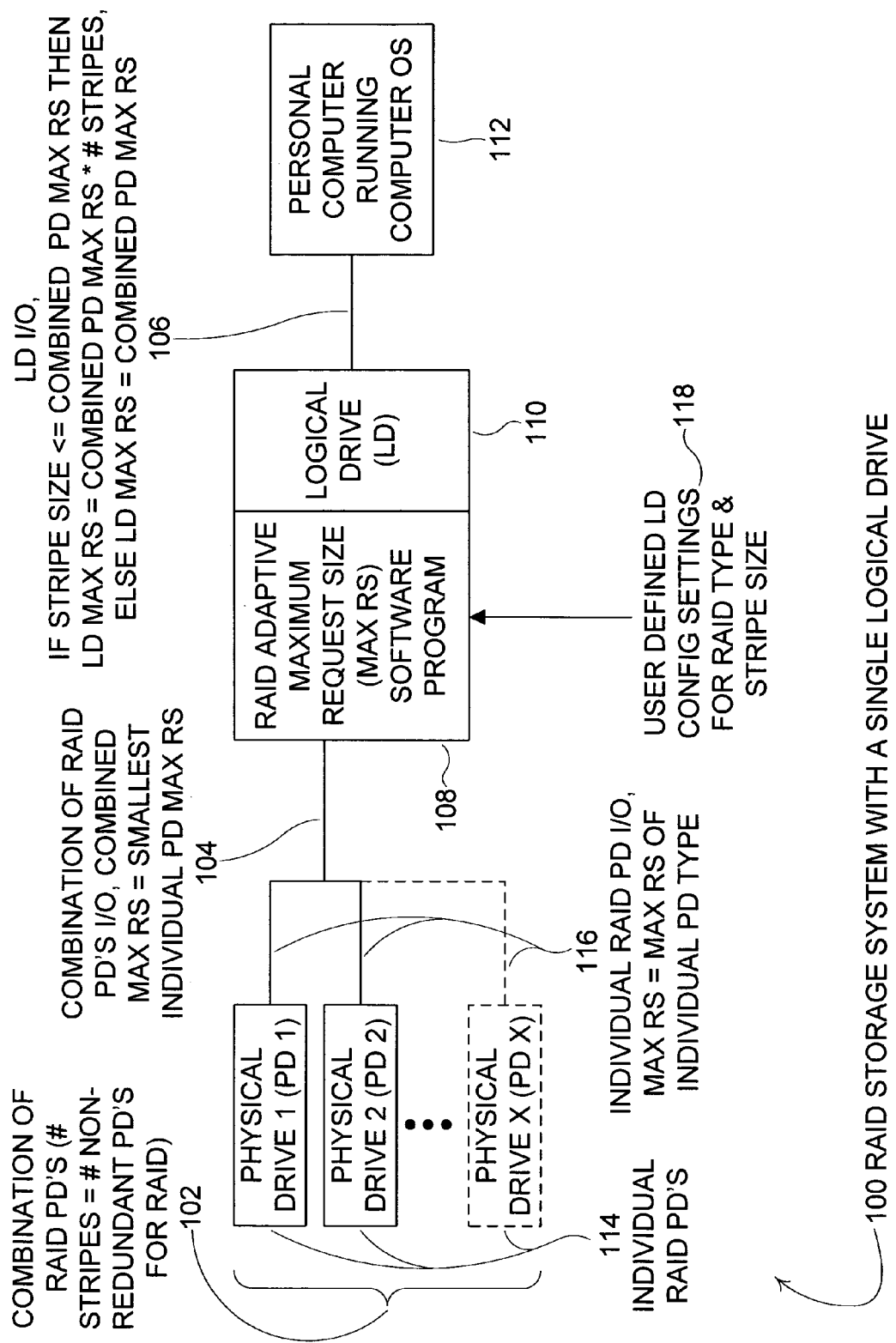
FIG. 1 is a schematic illustration of an embodiment of an adaptive maximum request size RAID storage system with a single logical drive.

FIG. 1 is a schematic illustration of an embodiment 100 of an adaptive maximum request size RAID storage system with a single logical drive. A combination of RAID Physical Drives (PD's) 102 is made up of at least one individual RAID physical drive 114. The RAID type chosen by the user 118 dictates whether more than one RAID physical drive 114 is required. For instance, a RAID Logical Drive (LD) 110 of type RAID-1 requires two RAID physical drives 114. The number of stripes for the RAID logical drive 110 is equal to the number of non-redundant RAID physical drives 114 contained in the combination of RAID physical drives 102, as defined by the RAID type entered 118 for the RAID logical drive 110. For a RAID logical drive 110 of type RAID-0, the number of stripes is equal to the number of RAID physical drives 114 contained in the combination of RAID physical drives 102 since there is no redundancy for a RAID-0 system. For a RAID logical drive 110 of type RAID-1, the number of stripes is equal to one because a RAID-1 is made up of two RAID physical drives 114, with one physical drive 114 being a copy, or mirror, of the other physical drive 114, hence, there is only one non-redundant physical drive. The RAID physical drives 114 do not need to consist of all of the same type of physical drive. The type of the physical drive is determined by the physical drive standard and standard revision supported by each RAID physical drive 114. The type of the RAID physical drive 114 determines the maximum request size (Max RS) for the individual Input/Output (I/O) communication 116 for each individual RAID physical drive 114. The maximum request size for the I/O communication 104 of the combination of RAID physical drives 102 is equal to the smallest maximum request size of the communication I/O 116 for each individual RAID physical drive 114. The maximum request size for the communication I/O 104 of the combination of RAID physical drives 102 is obtained using Equation 1 below.

Combination PD's Max RS=min(PD1 Max RS, PD2 Max RS, . . . )  Equation 1:

Unless the RAID system 100 is sold as a package with the physical drives 116 and a hardware RAID controller 108, the RAID controller software 108 cannot know in advance the type of physical drives 116 that will constitute a RAID storage system 100. Thus, most RAID controller software 108, also called a RAID device driver 108, limits the RAID logical drive 110 maximum request size to the limits of older generation physical drives so that the RAID controller software 108 supports both the older generation and the newer generation physical drives. Including the adaptive maximum request size process 108 in the RAID controller software 108 allows a RAID system 100 to optimize performance based on the physical drive characteristics of the physical drives 116 selected for inclusion in the RAID system 100. The adaptive maximum request size process 108 permits a RAID system 100 to operate at older generation performance levels when there are both older generation and newer generation physical drives, as well as performing at the newer generation enhanced levels when only newer generation physical drives are used.

The maximum request size of the RAID logical drive 110 is an important performance characteristic because the maximum request size controls the maximum allowable packet size for a single I/O communication 106 burst between the host computer 112 and the RAID logical drive 106. In certain situations, such as database transactions, smaller packets sizes are desired to match the data flow, and hence, the maximum request size is not the limiting factor. The maximum request size plays a crucial role for operations such as drive rebuilding, drive consistency checks, and drive migration, where the largest transfer size possible is desired. With the maximum request size as the upper limit, the computer operating system 112 is able to optimize performance by selecting the transfer size most appropriate for the data transfer operation.

RAID systems that are put together, without a dedicated hardware RAID controller and pre-defined physical drives, tend to be put together by end users who are primarily concerned with creating a RAID system at minimal cost. IDE/ATA physical drives tend to be less expensive than SCSI physical drives, and IDE/ATA physical drives are the typical type of physical drive included with a new computer purchase. Using the original IDE/ATA physical drive as one of the physical drives in a newly configured RAID system keeps the cost of the RAID system as low as possible. An adaptive maximum request size process is most applicable to the cheaper, ad hoc, RAID storage system where the physical drive type may vary more than for a dedicated RAID storage system. Since IDE/ATA physical drives are the most common physical drives for an ad hoc RAID storage system, the specific discussion of maximum request size values for the adaptive maximum request size process will use IDE/ATA values.

Currently available IDE/ATA physical drives support addressing schemes ranging from 8-bits to 64-bits. The maximum address size is directly related to the supported address size of the drive. The address size determines the overall addressable memory storage, or the maximum storage capacity, of the physical drive, as well as the maximum request size for a single data transfer communication packet. Two common maximum request sizes are 32 MB for 48-bit addressing and 128 KB for 28-bit addressing. The 48-bit addressing applies to Ultra Direct Memory Access 6 (UDMA-6) capable drives, which account for most of the new drives on the market today. Many currently installed drives are Pre-UDMA-6 drives and only support 28-bit addressing. When the RAID controller fixes the maximum transfer size to 128 KB, as is typical of current RAID controller software, data transfer operations that benefit from large packet sizes are significantly slower than in comparison to a system that permits data transfer sizes of up to 32 MB as is permitted by UDMA-6 capable drives. The adaptive maximum request size process permits the computer operating system additional capacity to optimize data flow between the RAID logical drive and the host computer.

The RAID adaptive maximum request size software program 108 is a RAID controller, or device driver, software program 108 that contains additional functionality to determine the maximum request size for a RAID logical drive 110. The RAID adaptive maximum request size software program 108 may be implemented as either a device driver residing within the computer operating system 112, or as a firmware program residing on a separate hardware device. The maximum request size for the RAID logical drive 110 is based on the maximum request sizes of the RAID physical drives 114 and the user defined RAID type and stripe size 118 of the RAID logical drive 110. The RAID adaptive maximum request size software program 108 interrogates each individual RAID physical drive 114 to determine the maximum request size of each individual RAID physical drive 114. The RAID adaptive maximum request size software program 108 then sets the maximum request size for the combination of RAID physical drives 102 to match the smallest maximum request size determined for each of the individual RAID physical drives 114. The RAID adaptive maximum request size software program accepts user entries 118 to define the RAID type and the stripe size for the RAID logical drive 110. If the stripe size of the RAID logical drive 110 is less than or equal to the maximum request size of the combination of RAID physical drives 102, then the RAID adaptive maximum request size software program 108 sets the RAID logical drive 110 maximum request size equal to the result of the maximum request size of the combination of RAID physical drives 102 multiplied times the number of stripes for the RAID logical drive 110. If the stripe size for the RAID logical drive 110 is greater than the maximum request size of the combination of RAID physical drives 102, then the RAID adaptive maximum request size software program 108 sets the RAID logical drive 110 maximum request size equal to the maximum request size of the combination of RAID physical drives 102. The RAID adaptive maximum request size software program 108 determines the maximum request size of the RAID logical drive 110 using Equation 2 below.

Equation 2:

If (LD Stripe Size <= Combination PD's Max RS) then
    LD Max RS = Combination PD's Max RS * LD Number of Stripes
Else
    LD Max RS = Combination PD's Max RS The RAID adaptive maximum request size software program 108 reports the calculated maximum request size of the RAID logical drive 110 to the computer operating system of the host personal computer 112. The computer operating system 112 uses the maximum request size of the RAID logical drive 110 to limit communication I/o 106 with the RAID logical drive 110. With the upper limit of the maximum request size of the RAID logical drive 110, the computer operating system 112 may optimize the transfer request size of the RAID logical drive 110 communication I/O 106 to best match the type of data being transferred between the personal computer 112 and the RAID logical drive 110.

Figure 2:
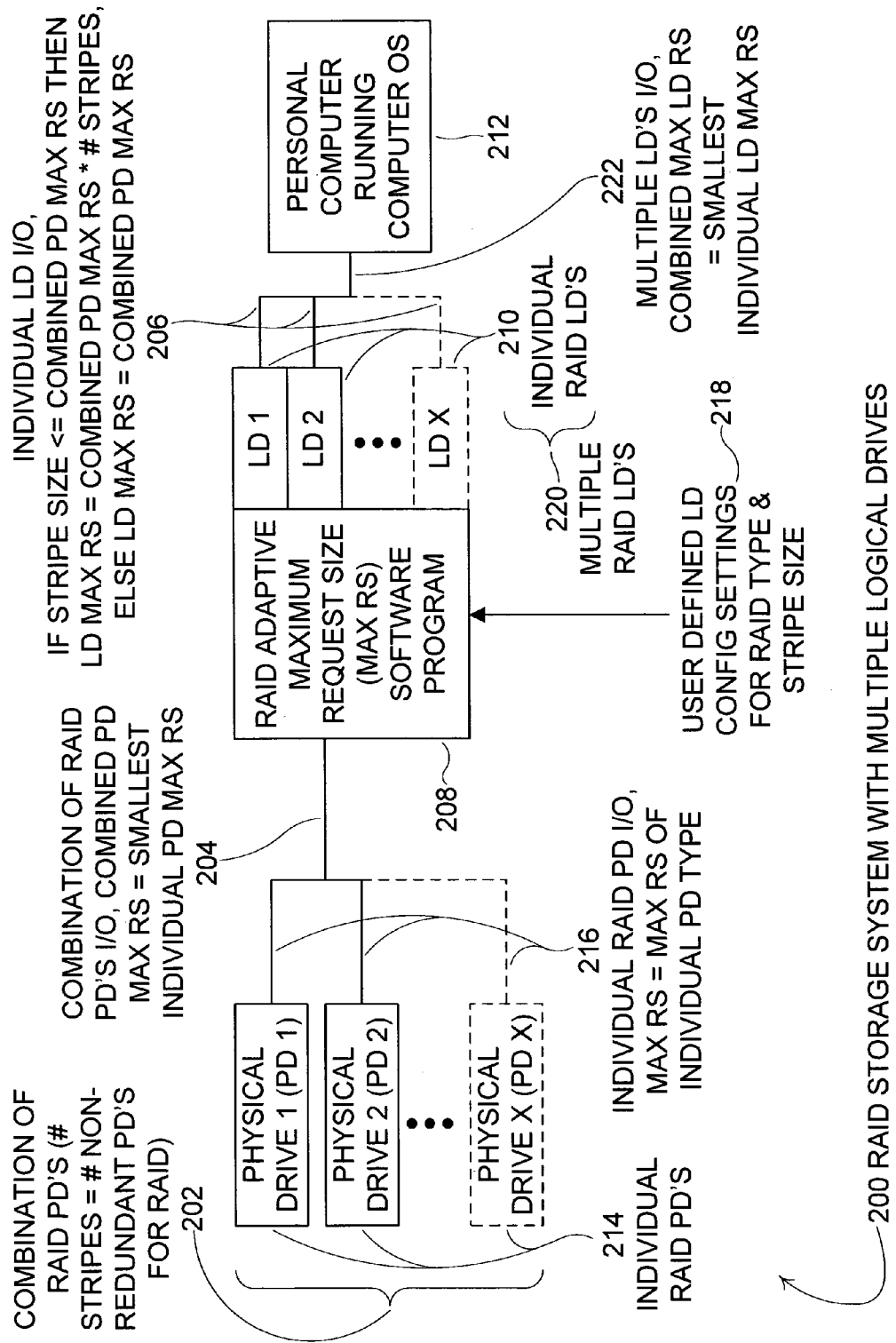
FIG. 2 is a schematic illustration of an embodiment of an adaptive maximum request size RAID storage system with multiple logical drives.

FIG. 2 is a schematic illustration of an embodiment 200 of an adaptive maximum request size RAID storage system with multiple logical drives. The embodiment 200 of FIG. 2 is the same as the embodiment 100 described with respect to FIG. 1, except there are multiple RAID logical drives 220 instead of a single RAID logical drive. A combination of RAID Physical Drives (PD's) 202 is made up of at least one individual RAID physical drive 214. The RAID type chosen by the user 218 for each RAID logical drive 210 dictates whether more than one RAID physical drive 214 is required. For instance, a RAID Logical Drive (LD) 210 of type RAID-1 requires two RAID physical drives 214. The number of stripes for each RAID logical drive 210 is equal to the number of non-redundant RAID physical drives 214 contained in the combination of RAID physical drives 202 as defined by the RAID type entered 218 for each RAID logical drive 210. The RAID types for each of the logical drives 210 must be selected so the number of RAID physical drives 214 is capable of satisfying the requirements for the RAID type of each RAID logical drive 210. For a RAID logical drive 210 of type RAID-0, the number of stripes is equal to the number of RAID physical drives 214 contained in the combination of RAID physical drives 202 since there is no redundancy for a RAID-0 system. For a RAID logical drive 210 of type RAID-1, the number of stripes is equal to one because a RAID-1 is made up of two RAID physical drives 214, with one physical drive 214 being a copy, or mirror, of the other physical drive 214, hence, there is only one non-redundant physical drive. The RAID physical drives 214 do not need to consist of all of the same type of physical drive. The type of the physical drive is determined by the physical drive standard and standard revision supported by each RAID physical drive 214. The type of the RAID physical drive 214 determines the maximum request size (Max RS) for the individual Input/Output (I/O) communication 216 for each individual RAID physical drive 214. The maximum request size for the I/O communication 204 of the combination of RAID physical drives 202 is equal to the smallest maximum request size of the communication I/O 216 for each individual RAID physical drive 214. The maximum request size for the communication I/O 204 of the combination of RAID physical drives 202 is obtained using Equation 1 defined in the description of the embodiment with respect to FIG. 1.

The RAID adaptive maximum request size software program 208 is a RAID controller, or device driver, software program that contains additional functionality to determine the maximum request size for multiple RAID logical drives 210. The RAID adaptive maximum request size software program 208 may be implemented as either a device driver residing within the computer operating system 212, or as a firmware program residing on a separate hardware device. The maximum request size for each individual RAID logical drive 210 is based on the maximum request sizes of the RAID physical drives 214 and the user defined RAID type and stripe size 218 of each individual RAID logical drive 210. The RAID adaptive maximum request size software program 208 interrogates each individual RAID physical drive 214 to determine the maximum request size of each individual RAID physical drive 214. The RAID adaptive maximum request size software program 208 then sets the maximum request size for the combination of RAID physical drives 202 to match the smallest maximum request size determined for each of the individual RAID physical drives 214. The RAID adaptive maximum request size software program accepts user entries 218 to define the RAID type and the stripe size for each of the individual RAID logical drives 210. The RAID adaptive maximum request size software program then calculates the possible maximum request size for each RAID logical drive 210. If the stripe size of the RAID logical drive 210 is less than or equal to the maximum request size of the combination of RAID physical drives 202, then the RAID adaptive maximum request size software program 208 sets the RAID logical drive 210 maximum request size equal to the result of the maximum request size of the combination of RAID physical drives 202 multiplied times the number of stripes for the RAID logical drive 210. If the stripe size for the RAID logical drive 210 is greater than the maximum request size of the combination of RAID physical drives 202, then the RAID adaptive maximum request size software program 208 sets the RAID logical drive 210 maximum request size equal to the maximum request size of the combination of RAID physical drives 202. The RAID adaptive maximum request size software program 208 determines the maximum request size of each RAID logical drive 210 using Equation 2 defined in the description of the embodiment with respect to FIG. 1.

The maximum request size for the communication I/O 222 for all of the individual RAID logical drives 210 of the multiple RAID logical drives 220 is limited to the smallest maximum request size calculated for the communication I/O 206 of each of the individual RAID logical drives 210. The maximum request size for the communication I/O 206 of the combination of multiple RAID logical drives 220 is obtained using Equation 3 below.

Combination $LD$'s Max $RS$=min($LD1$ Max $RS$, $PL2$ Max $RS$, ... )  Equation 3:

The RAID adaptive maximum request size software program 208 reports the calculated combination of multiple RAID logical drives 220 maximum request size to the computer operating system of the host personal computer 212 as the maximum request size for each individual RAID logical drive 210. The computer operating system 112 uses the maximum request size reported for each RAID logical drive 210 to limit communication I/O 206 with each RAID logical drive 210. With the upper limit of the maximum request size of each RAID logical drive 210, the computer operating system 212 may optimize the transfer request size for each RAID logical drive 210 communication I/O 206 to best match the type of data being transferred between the personal computer 212 and the RAID logical drive 210.

Figure 3:
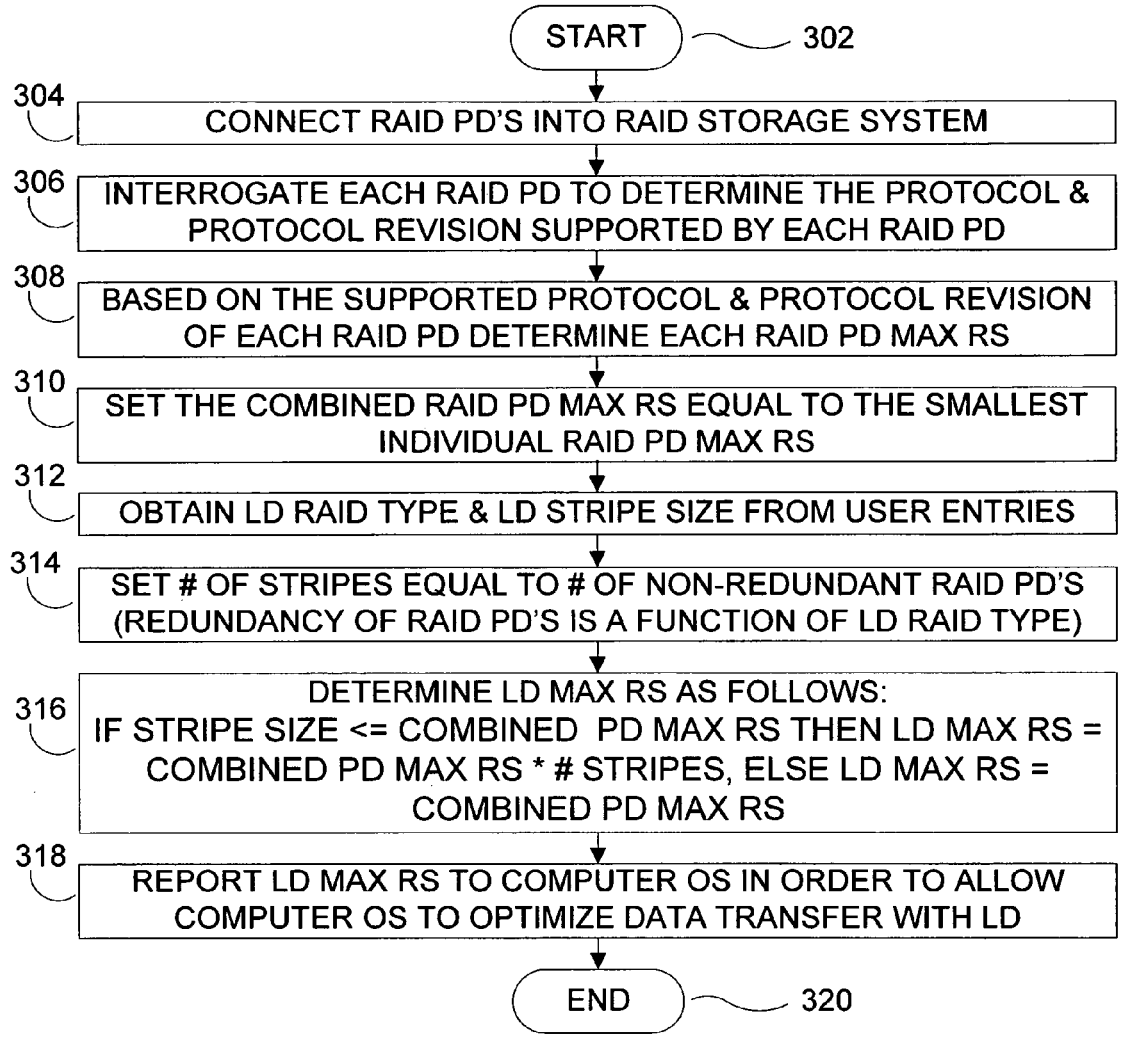
FIG. 3 is a flow chart describing the process for determining the maximum request size for an embodiment with a single logical drive.

FIG. 3 is a flow chart 300 describing the process for determining the maximum request size for an embodiment with a single logical drive. To start 302, connect the RAID physical drives to the computer system 304. Next, interrogate each RAID physical drive to determine the physical drive protocol and protocol revision that each RAID physical drive supports 306. Based on the supported protocol and protocol revision of each RAID physical drive, determine the maximum request size for each RAID physical drive 308. Set the combined physical drive maximum request size value to the smallest maximum request size selected from all of the individual RAID physical drive maximum request sizes 310. Step 310 is described by Equation 1, which is defined in the description of the embodiment with respect to FIG. 1. The next step is to obtain the RAID type and the stripe size of the RAID logical drive from user data entries 312. The number of stripes is then set equal to the number of non-redundant RAID physical drives 314. The number of non-redundant RAID physical drives is a function of the RAID type of the RAID logical drive 314. Next, the maximum request size of the RAID logical drive is calculated 316. If the stripe size of the RAID logical drive is less than or equal to the combined physical drive maximum request size, then the RAID logical drive maximum request size is equal to the combined physical drive maximum request size multiplied times the number of stripes for the RAID logical drive 316. If the stripe size of the RAID logical drive is greater than the combined physical drive maximum request size, then the RAID logical drive maximum request size is equal to the combined physical drive maximum request size 316. Step 316 is described by Equation 2, which is defined in the description of the embodiment with respect to FIG. 1. The last step 318, before ending 320, is to report the RAID logical drive maximum request size that was calculated for the RAID logical drive to the computer operating system so that the computer operating system may optimize data transfer with the RAID logical drive 318.

Figure 4:
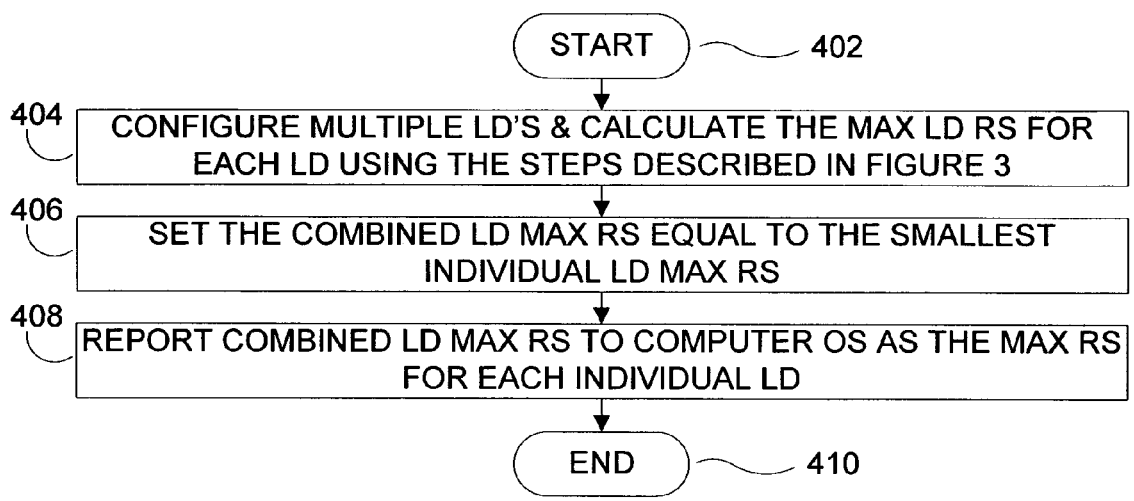
FIG. 4 is a flow chart describing the process for determining the maximum request size for an embodiment with multiple logical drives.

FIG. 4 is a flow chart 400 describing the process for determining the maximum request size for an embodiment with multiple logical drives. To start 402, for each RAID logical drive of multiple RAID logical drives follow the process described in the description with respect to FIG. 3 in order to configure and calculate the maximum request size for each RAID logical drive 404. The next step 406 is to set the combined maximum request size of all of the multiple RAID logical drives to the smallest maximum request size calculated for any individual RAID logical drive in step 404. Step 406 is described by Equation 3, which is defined in the description of the embodiment with respect to FIG. 2. The last step 408, before ending 410, is to report the combined RAID logical drive maximum request size to the computer operating system as the maximum request size for each individual RAID logical drive 408.

Hence, the present invention allows a RAID storage system to determine a maximum request sized and make requests that fit within the maximum request size. The maximum request size is a primary limiting characteristic for both physical drive and logical drive performance. The logical drive maximum request size is limited by the physical drive maximum request size. Physical drives supporting older revisions of the physical drive standards have a much lower maximum request size than physical drives supporting newer revisions of the physical drive standards. In order to control physical drives that support both the old and new revisions of the physical drive standards, the typical RAID controller fixes the maximum request size to the lower value of the old revision of the physical drive standard. The adaptive maximum request size process permits a RAID system to adjust the maximum request size to reflect the highest possible maximum request size allowed for a given system based on the physical drives of the RAID system, and the RAID types of all RAID logical drives. The adaptive maximum request size process also permits a RAID system to mix physical drives from older and newer generations while still achieving the highest possible maximum request size for the RAID system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for optimizing the communication speed of a RAID storage system comprising the steps of:
    connecting a combination of RAID physical drives containing at least one RAID physical drive to a personal computer in order to operate said combination of RAID physical drives as part of said RAID storage system, said RAID storage system creating a RAID logical drive to interface with said personal computer;
    inspecting each said RAID physical drive to determine a physical drive maximum request size value for each said RAID physical drive;
    determining a combined physical drive maximum request size value by setting said combined physical drive maximum request size value equal to the smallest said physical drive maximum request size value of any RAID physical drive in said combination of RAID physical drives;
    determining a number of stripes value for said RAID logical drive based on said combination of physical drives and a RAID type value for said RAID logical drive;
    determining a logical drive maximum request size value for said RAID logical drive, said logical drive maximum request size value determined by comparing a stripe size value for said RAID logical drive to said combined physical drive maximum request size value, if said stripe size value is greater than said combined physical drive maximum request size value then said logical drive maximum request size value is set equal to said combined physical drive maximum request size value, if said stripe size value is not greater than said combined physical drive maximum request size value then said logical drive maximum request size value is set equal to said physical drive maximum request size value multiplied times said number of stripes value; and
    reporting said logical drive maximum request size value of said RAID logical drive to said personal computer.

2. A method for optimizing the communication speed of a RAID storage system comprising the steps of:
    connecting a combination of RAID physical drives containing at least one RAID physical drive to a personal computer in order to operate said combination of RAID physical drives as part of said RAID storage system, said RAID storage system creating a RAID logical drive to interface with said personal computer, each said RAID physical drive may be any standard type of physical drive, said standard type of physical drive being a physical drive supporting any revision of any standard physical drive protocol, said RAID logical drive being a logical abstraction of a combination of RAID physical drive partitions, each said RAID physical drive containing one of said RAID physical drive partitions for said RAID logical drive, said RAID logical drive interfacing as a single logical data storage drive with a computer operating system, said computer operating system running on said personal computer;

inspecting each said RAID physical drive to determine a supported physical drive protocol and revision for each said RAID physical drive, said supported physical drive protocol and revision defining a permitted maximum request size value for a single data transfer request of any physical drive that operates according to said supported physical drive protocol and revision;

determining a physical drive maximum request size value for each said RAID physical drive by setting said physical drive maximum request size value of each said RAID physical drive equal to said permitted maximum request size value associated with said supported physical drive protocol and revision of each said RAID physical drive;

determining a combined physical drive maximum request size value by setting said combined physical drive maximum request size value equal to the smallest said physical drive maximum request size value of any RAID physical drive in said combination of RAID physical drives;

determining a logical drive maximum request size value for said RAID logical drive by performing a RAID logical drive maximum request size procedure, said RAID logical drive maximum request size procedure comprising the steps of:

setting a stripe size value for said RAID logical drive to a stripe size user configuration input value for said RAID logical drive;

setting a RAID type for said RAID logical drive to a RAID type user configuration input for said RAID logical drive;

setting a number of stripes value for said RAID logical drive equal to a total count of non-redundant RAID physical drives of said combination of RAID physical drives, said non-redundant RAID physical drives determined according to said RAID type of said RAID logical drive; and computing said logical drive maximum request size value for said RAID logical drive by comparing said stripe size value of said RAID logical drive to said combined physical drive maximum request size value, if said stripe size value of said RAID logical drive is greater than said combined physical drive maximum request size value then said logical drive maximum request size value of said RAID logical drive is set equal to said combined physical drive maximum request size value, if said stripe size value of said RAID logical drive is not greater than said combined physical drive maximum request size value then said logical drive maximum request size value of said RAID logical drive is set equal to said physical drive maximum request size value multiplied times said number of stripes value of said RAID logical drive; and reporting said logical drive maximum request size value of said RAID logical drive to said computer operating system of said personal computer, permitting said computer operating system to optimize data transfer with said RAID logical drive by permitting a data transfer size up to said logical drive maximum request size for said RAID logical drive.

3. The method of claim 2 wherein said standard type of physical drive is one of the group comprising: any revision of IDE/ATA data storage drive, and any revision of SCSI data storage drive.

4. The method of claim 2 further comprising the steps of:
creating multiple RAID logical drives;
determining said logical drive maximum request size value for each RAID logical drive of said multiple RAID logical drives by repeating said RAID logical drive maximum request size procedure for each RAID logical drive of said multiple RAID logical drives;

determining a combined logical drive maximum request size value by setting said combined logical drive maximum request size value equal to the smallest said logical drive maximum request size value determined for each RAID logical drive of said multiple RAID logical drives; and reporting said combined logical drive maximum request size value as said logical drive request size value for each RAID logical drive of said multiple RAID logical drives to said computer operating system of said personal computer, permitting said computer operating system to optimize data transfer with each RAID logical drive of said multiple RAID logical drives by permitting a data transfer size up to said combined logical drive maximum request size for each RAID logical drive of said multiple RAID logical drives.

5. A RAID adaptive maximum request size computer system for determining maximum request size values for a RAID storage system comprising:

a computer-readable electronic storage medium that stores computer instructions for performing processes that determine said maximum request size values for said RAID storage system;

a computer that reads said computer instructions from said electronic storage medium and performs said processes that determine said maximum request size values for said RAID storage system;

a RAID physical drive configuration process for defining RAID physical drive configuration settings of said RAID storage system, said RAID storage system comprising a combination of RAID physical drives containing at least one RAID physical drive connected to a personal computer in order to operate said combination of RAID physical drives as part of said RAID storage system, said RAID storage system having a RAID logical drive to interface with said personal computer, said RAID physical drive configuration process further comprising:

a physical drive maximum request size value for each said RAID physical drive, said physical drive maximum request size value set in accordance with physical attributes of each said RAID physical drive;

a combined physical drive maximum request size value, said combined physical drive maximum request size value being equal to the smallest said physical drive maximum request size value of any RAID physical drive in said combination of RAID physical drives;

a RAID logical drive configuration process for defining RAID logical drive configuration settings of said RAID storage system, said RAID logical drive configuration process further comprising:

a number of stripes value for said RAID logical drive, said number of stripes value being based on said combination of physical drives and a RAID type value for said RAID logical drive;

a logical drive maximum request size value for said RAID logical drive determined by comparing a stripe size value for said RAID logical drive to said combined physical drive maximum request size value, if said stripe size value is greater than said combined physical drive maximum request size value then said logical drive maximum request size value is set equal to said combined physical drive maximum request size value, if said stripe size value is not greater than said combined physical drive maximum request size value then said logical drive maximum request size value is set equal to said physical drive maximum request size value multiplied times said number of stripes value; and a RAID operation process, said RAID operation process reporting said logical drive maximum request size value of said RAID logical drive to said personal computer.

6. A RAID adaptive maximum request size computer system for determining maximum request size values for a RAID storage system comprising:

a computer-readable electronic storage medium that stores computer instructions for performing processes that determine said maximum request size values for said RAID storage system;

a computer that reads said computer instructions from said electronic storage medium and performs said processes that determine said maximum request size values for said RAID storage system;

a RAID physical drive configuration process for defining RAID physical drive configuration settings of said RAID storage system, said RAID storage system comprising a combination of RAID physical drives containing at least one RAID physical drive connected to a personal computer in order to operate said combination of RAID physical drives as part of said RAID storage system, said RAID storage system having a RAID logical drive to interface with said personal computer, each said RAID physical drive may be any standard type of physical drive, said standard type of physical drive being a physical drive supporting any revision of any standard physical drive protocol, said RAID logical drive being a logical abstraction of a combination of RAID physical drive partitions, each said RAID physical drive containing one of said RAID physical drive partitions for said RAID logical drive, said RAID logical drive interfacing as a single logical data storage drive with a computer operating system, said computer operating system running on said personal computer, said RAID physical drive configuration process further comprising:

a supported physical drive protocol and revision value for each said RAID physical drive, said supported physical drive protocol and revision value obtained by reading physical drive definition data from each said RAID physical drive, said supported physical drive protocol and revision value indicating a supported physical drive protocol and revision, said supported physical drive protocol and revision defining a permitted maximum request size value for a single data transfer request of any physical drive that operates according to said supported physical drive protocol and revision;

a physical drive maximum request size value for each said RAID physical drive, said physical drive maximum request size value for each said RAID physical drive being equal to said permitted maximum request size value associated with said supported physical drive protocol and revision of each said RAID physical drive;

a combined physical drive maximum request size value, said combined physical drive maximum request size value being equal to the smallest said physical drive maximum request size value of any RAID physical drive in said combination of RAID physical drives;

a RAID logical drive configuration process for defining RAID logical drive configuration settings of said RAID storage system, said RAID logical drive configuration process further comprising:

a stripe size user configuration input for said RAID logical drive for obtaining a stripe size value for said RAID logical drive;

a RAID type user configuration input for said RAID logical drive for obtaining a RAID type for said RAID logical drive; and a number of stripes value for said RAID logical drive, said number of stripes value for said RAID logical drive being set equal to a total count of non-redundant RAID physical drives of said combination of RAID physical drives, said non-redundant RAID physical drives determined according to said RAID type of said RAID logical drive;

a logical drive maximum request size value for said RAID logical drive determined by comparing said stripe size value of said RAID logical drive to said combined physical drive maximum request size value, if said stripe size value of said RAID logical drive is greater than said combined physical drive maximum request size value then said logical drive maximum request size value of said RAID logical drive is set equal to said combined physical drive maximum request size value, if said stripe size value of said RAID logical drive is not greater than said combined physical drive maximum request size value then said logical drive maximum request size value of said RAID logical drive is set equal to said physical drive maximum request size value multiplied times said number of stripes value of said RAID logical drive;

a RAID operation process that creates and operates said RAID storage system according to said RAID physical drive configuration settings and said logical drive configuration settings, said RAID operation process reporting said logical drive maximum request size value of said RAID logical drive to said computer operating system of said personal computer, permitting said computer operating system to optimize data transfer with said RAID logical drive by permitting a data transfer size up to said logical drive maximum request size for said RAID logical drive.

7. The RAID adaptive maximum request size computer system of claim 6 wherein said standard type of physical drive is one of the group comprising: any revision of IDE data storage drive, and any revision of SCSI data storage drive.

8. The RAID adaptive maximum request size computer system of claim 6 wherein said RAID storage system has multiple RAID logical drives, and said RAID operation process reports a combined logical drive maximum request size value as said logical request size value for each RAID logical drive of said multiple RAID logical drives to said computer operating system of said personal computer, and said RAID adaptive maximum request size software program further comprises:

a combined logical drive maximum request size process for determining said combined logical drive maximum request size value, said combined logical drive maximum request size process repeating said RAID logical drive configuration process for each RAID logical drive of said multiple RAID logical drives, and said combined logical drive maximum request size process setting said combined logical drive maximum request size value equal to the smallest said logical drive maximum request size value determined for each RAID logical drive of said multiple RAID logical drives.

9. The RAID adaptive maximum request size computer system of claim 6 wherein said RAID adaptive maximum request size software program runs as a device driver software program under the computer operating system of said personal computer.

10. The RAID adaptive maximum request size computer system of claim 6 wherein said RAID adaptive maximum request size software program runs as firmware on a RAID controller device.

\* \* \* \* \*